United States Patent [19]

Harley et al.

[11] Patent Number: 5,327,880
[45] Date of Patent: Jul. 12, 1994

[54] BORESCOPE

[75] Inventors: Jennifer M. Harley; Andrew W. Towch, both of Leigh-on-Sea, United Kingdom

[73] Assignee: Keymed (Medical & Industrial Equipment) Ltd., Southend-On-Sea, United Kingdom

[21] Appl. No.: 929,247

[22] Filed: Aug. 13, 1992

[30] Foreign Application Priority Data

Aug. 16, 1991 [GB] United Kingdom ............ 9117689.1

[51] Int. Cl.⁵ .............................................. A61B 1/06
[52] U.S. Cl. ............................................ 128/6; 128/4
[58] Field of Search ............................ 128/4, 6, 7, 8

[56] References Cited

U.S. PATENT DOCUMENTS

| | | | |
|---|---|---|---|
| 4,248,213 | 2/1981 | Landre | 128/6 |
| 4,414,962 | 11/1983 | Carson | 128/6 |
| 4,624,243 | 11/1986 | Lowery et al. | 128/6 |
| 4,702,571 | 10/1987 | Barber | |
| 4,727,859 | 3/1988 | Lia | 128/6 |
| 4,782,819 | 11/1988 | Adair | 128/6 |
| 4,823,244 | 4/1989 | Alaybayoglu et al. | 128/6 X |
| 4,838,245 | 6/1989 | Storz | 128/6 |
| 5,183,031 | 2/1993 | Rossoff | 128/6 |

FOREIGN PATENT DOCUMENTS

| | | | |
|---|---|---|---|
| 0260855 | 3/1988 | European Pat. Off. | |
| 1900017 | 8/1970 | Fed. Rep. of Germany | 128/6 |
| 3441130 | 5/1986 | Fed. Rep. of Germany | 128/4 |
| 564856 | 8/1977 | U.S.S.R. | 128/4 |
| 835172 | 5/1960 | United Kingdom | |
| 895893 | 5/1962 | United Kingdom | |
| 1040113 | 8/1966 | United Kingdom | |
| 1042874 | 9/1966 | United Kingdom | |
| 1078036 | 8/1967 | United Kingdom | |
| 1393699 | 5/1975 | United Kingdom | |
| 1526069 | 9/1978 | United Kingdom | |
| 2040064 | 8/1980 | United Kingdom | 128/6 |
| 2138687 | 10/1984 | United Kingdom | 128/4 |
| 2197496A | 5/1988 | United Kingdom | |

Primary Examiner—Richard J. Apley
Assistant Examiner—Karen A. Jalbert
Attorney, Agent, or Firm—Kenyon & Kenyon

[57] ABSTRACT

A borescope (FIGS. 1 and 4) comprises an objective probe (2) connected to a body (8), an occular assembly (12) pivotally connected to the body so as to be pivotally movable about a pivotal axis (16) extending transversely with respect to the objective probe, and an optical fibre bundle (53) connected to a light source (19) and extending through the probe to illuminate an object presented to the probe. The occular system comprises a housing (11) pivotally connected to the body and cooperating with the body to define a channel (50) through which a flexible portion of the optical fibre bundle extends from the occular assembly into the body whereby pivotal motion of the occular assembly is accommodated by flexure of the optical fibre bundle within the channel. A tubular pivot member (34) is connected to the body and defines the pivotal axis. An optical system (44) consists of a series of lenses (45) and mirrors (37, 47) for transferring an image of the object through the probe to an eyepiece (17) of the occular system and defines an optical axis (46) extending through the tubular pivot member coaxially with the pivotal axis, and wherein the channel comprises an annular space (50) external to the pivot member. The borescope is suitable for use in vehicle body and engine inspection.

7 Claims, 4 Drawing Sheets

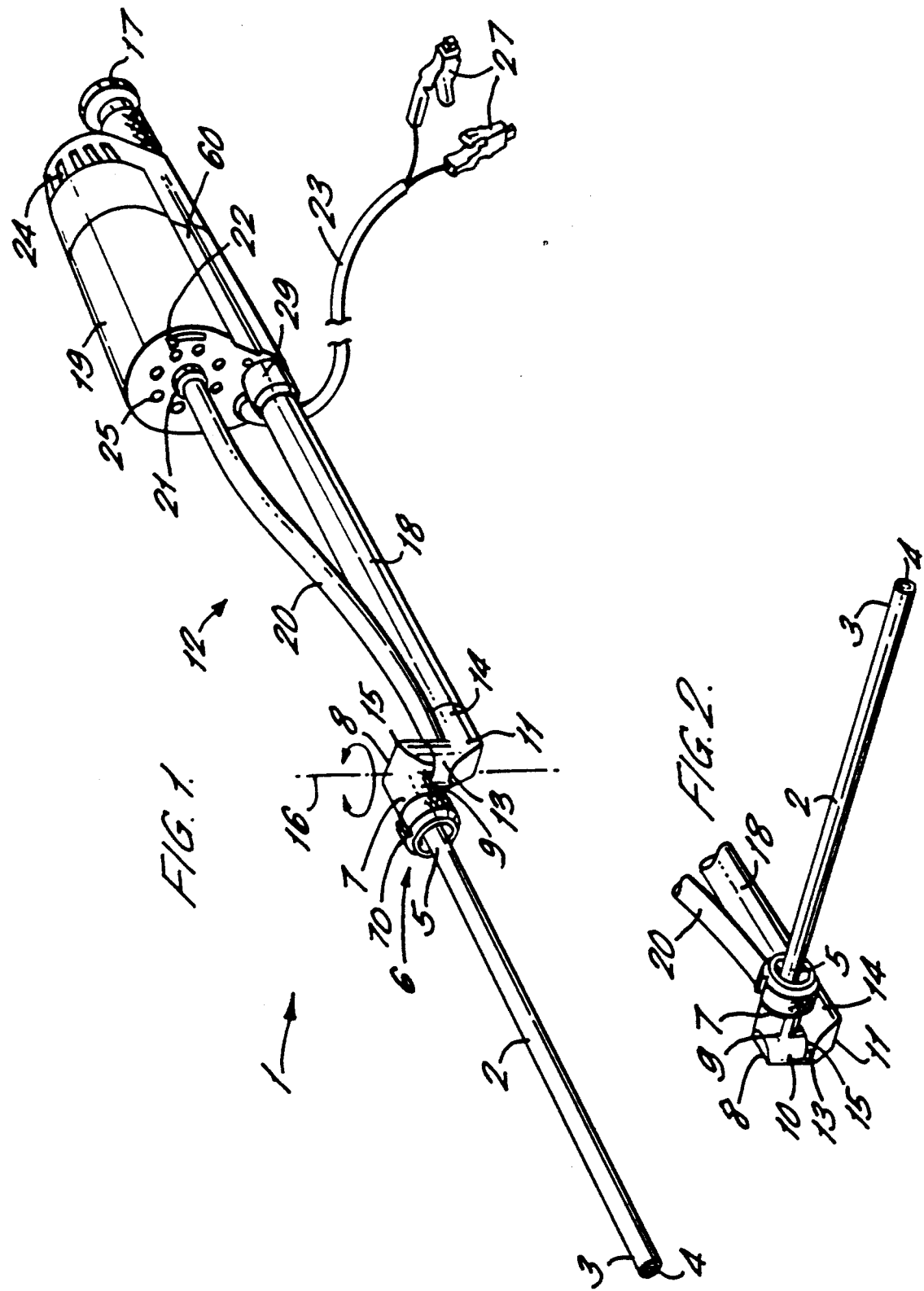

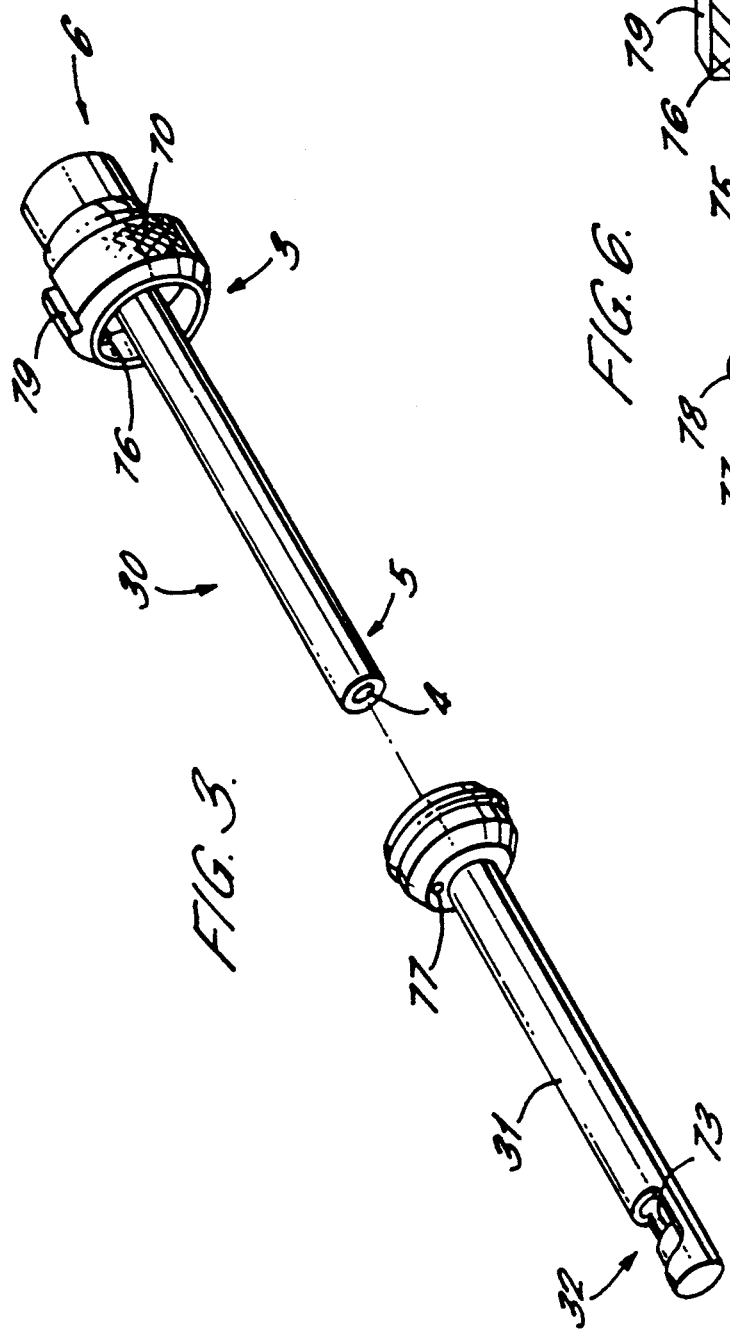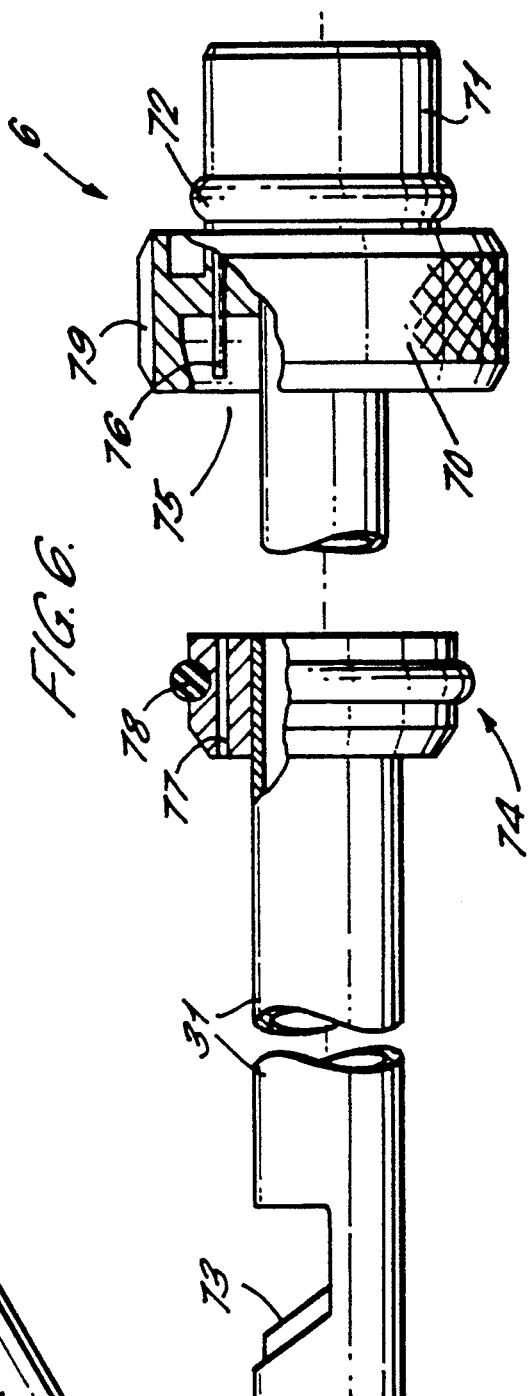

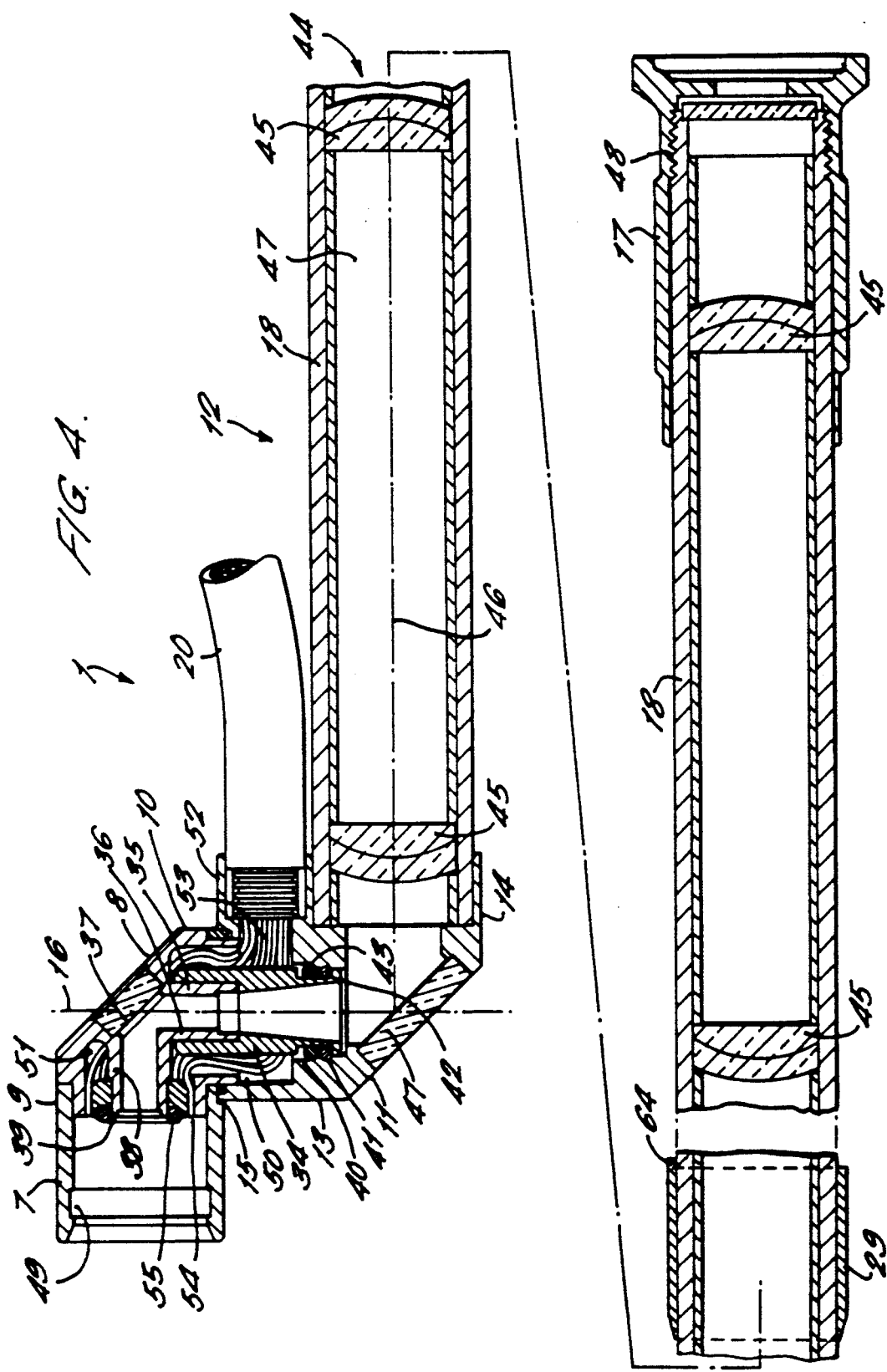

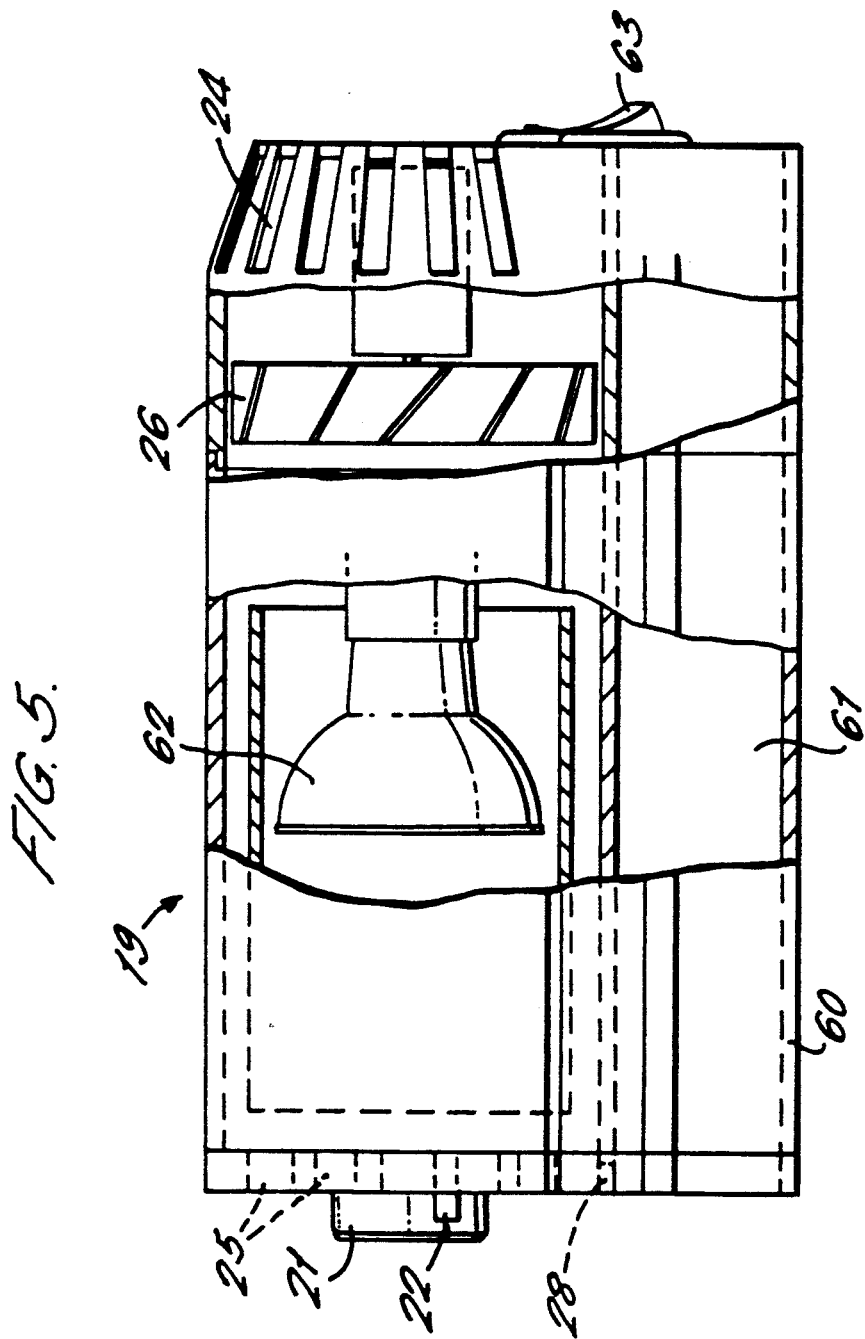

BORESCOPE

This invention relates to borescopes and in particular but not exclusively to borescopes for use in vehicle body and engine inspection.

Borescopes have been used for many years for the inspection of inaccessible objects particularly where the only access to make an inspection is through a narrow bore. More recently borescopes have been adapted for use as an automotive inspection device for example in the internal or external inspection of car engines. Such borescopes typically comprise both an optical system and an illuminating optical fibre bundle within a narrow tubular objective probe. The probe is typically connected to a body having a light guide connector enabling the optical fibre bundle to be supplied with light from a light source via a suitable light guide. An occular system including an eyepiece is also connected to the body.

In such borescopes the eyepiece is mounted on the end of a viewing tube which is cranked at a fixed angle relative to the probe or which is pivotable relative to the probe by means of pivotal connection between the occular system and the body.

According to the present invention there is disclosed a borescope comprising an objective probe connected to a body, an occular assembly pivotally connected to the body so as to be pivotally movable about a pivotal axis extending transversely with respect to the objective probe, and an optical fibre bundle connected to a light source and extending through the probe to illuminate an object presented to the probe, the occular system comprising a housing pivotally connected to the body and cooperating with the body to define a channel through which a flexible portion of the optical fibre bundle extends from the occular assembly into the body whereby pivotal motion of the occular assembly is accommodated by flexure of the optical fibre bundle within the channel, the borescope comprising a tubular pivot member connected to one or other of the body and the housing and defining the pivotal axis and the borescope further comprising an optical system consisting of a series of lenses and mirrors for transferring an image of the object through the probe to an eyepiece of the occular system and defining an optical axis extending through the tubular pivot member coaxially with the pivotal axis, and wherein the channel comprises an annular space external to the pivot member.

This provides a more compact and convenient arrangement and avoids having the light guide emerging from the body at an angle which is dependent on the orientation of the probe. This has hitherto made the manipulation of known borescopes unduly cumbersome.

Conveniently the tubular pivot member is fixedly connected to the body and is journalled in the housing.

Preferably the occular assembly includes a viewing tube extending between the housing and the eyepiece whereby the eyepiece is located remotely from the housing and wherein the light source is mounted on the viewing tube.

An advantage of this arrangement is that the borescope is then self-contained and does not require connection to a separate light guide and light source. This makes the use of the borescope considerably simpler than known borescopes.

Preferably the optical fibre bundle extends through a light guide cable extending between the light source and the housing.

Since the light source and the housing remain in fixed positions relative to one another there is no requirement for flexure of the light guide cable during adjustment of the position of the borescope.

Preferably the probe is releasably connected to a probe connector of the body and the optical fibre bundle includes a first portion extending continuously and unitarily between the probe connector and the light source.

An advantage of this arrangement is that it avoids the need for an additional connector found in known borescopes and which is operable to connect the light guide cable to the body to which the probe is connected. Since each connection between portions of optical fibre bundles results in significant light losses, the borescope of the present invention is therefore more efficient in terms of the light conducted from the light source to the probe.

Conveniently the light source comprises a casing defining a cylindrical bore receiving the viewing tube.

Preferably the eyepiece is removable from the viewing tube to facilitate assembly and disassembly of the viewing tube and light source.

Conveniently the probe is releasably connected to the body by coupling means facilitating relative rotation between the probe and the body and wherein the probe is provided with a removable sheath having a lateral viewing mirror, the sheath being connectable to the probe such that the probe and sheath are keyed together for rotation in unison relative to the body.

According to a further aspect of the present invention there is disclosed a borescope comprising an objective probe connected to a body, an occular assembly connected to the body, and an optical fibre bundle connected to a light source and extending through the probe to illuminate an object presented to the probe, the occular assembly comprising a viewing tube connected to an eyepiece and wherein the light source comprises a casing defining a cylindrical bore receiving the viewing tube whereby the light source is mounted on the viewing tube.

The borescope in this instance may be of the type including a viewing tube which is cranked at a fixed angle relative to the probe or may be of the type in which the viewing tube is pivotal relative to the probe.

Specific embodiments of the invention will now be described by way of example only and with reference to the accompanying drawings of which:

FIG. 1 is a perspective view of a borescope in accordance with the present invention;

FIG. 2 is a perspective view of part of the borescope of FIG. 1 in which the probe is pivoted relative to the occular system;

FIG. 3 is a perspective view of an alternative probe for use with the borescope of FIGS. 1 and 2 and a lateral viewing sheath for use with the alternative probe;

FIG. 4 is a sectioned elevation of the occular system of the borescope of FIGS. 1 and 2;

FIG. 5 is a part sectioned elevation of the light source of the borescope of FIGS. 1, 2 and 4, and FIG. 6 is an enlarged detail of the sheath and probe of FIG. 3 shown in partly sectioned elevation.

In FIG. 1 a borescope 1 comprises an objective probe 2 having a distal end portion 3 which in use is inserted into an inaccessible area to be inspected.

The probe 2 has a forward looking end window 4 at the distal end portion 3 through which an object may be inspected. The probe 2 has a proximal end portion 5 with a male connector 6 which is received within a female connector 7 of a body 8.

The body 8 is elbow shaped and includes a longitudinally extending portion 9 which extends parallel to the probe 2 and a transversely extending portion 10 which extends at 90° to the longitudinally extending portion.

The body 8 is pivotally connected to a housing 11 of an occular assembly 12. The housing 11 is similarly elbow shaped having a transversely extending portion 13 and a longitudinally extending portion 14. The respective transversely extending portions 10 and 13 of the probe 2 and housing 11 abut at an interface 15 and are pivoted so as to be relatively rotatable about a transversely extending pivotal axis 16.

The occular assembly 12 includes an eyepiece 17 which is connected to the longitudinally extending portion 14 of the housing 11 by a viewing tube 18.

A light source 19 is mounted on the viewing tube 18. A light guide 20 projects from the transversely extending portion 13 of the housing 11 and is connected to the light source 19 by means of a light guide connector 21.

The light source 19 includes a shutter control 22 enabling the light amplitude to be manually adjusted and is electrically powered by supply leads 23 with clips 27 suitable for connection to a car battery. The light source 19 is air cooled and includes air inlet apertures 24 and air outlet apertures 25 through which forced air cooling is provided by an internal fan 26 as shown in FIG. 5.

The pivotal action of the borescope 1 is illustrated in FIG. 2 where probe 2 has been rotated through 90° relative to the position shown in FIG. 1.

The probe 2 of FIGS. 1 and 2 is releasably coupled to the body 8 and is interchangeable with further probes of different dimensions and viewing angles. The probe 2 is coupled with the body 8 in a manner which allows rotation relative to the body about the longitudinal axis of the probe. A knurled grab ring 70 is provided at the proximal end 5 to allow the probe to be manually gripped during assembly and disassembly with the body 8. In FIGS. 3 and 6 an alternative probe 30 is illustrated, probe 30 being shorter than the probe 2 of FIG. 1 and having a lateral viewing sheath 31 with a side viewing window 32. The alternative probe 30 is described using corresponding reference numerals to those of FIGS. 1 and 2 where appropriate for corresponding elements. In particular the construction of the male connector 6 can be seen to include a cylindrical end portion 71 which is insertable with the female connector 7 and which is provided with an O-ring seal 72.

Probe 30 is provided with a removable sheath 31 which when fitted to the probe facilitates lateral viewing by means of a mirror 73. The sheath includes a push fit connector 74 which is engageable in a recess in grab ring 70 and is keyed to the probe 30 by means of a pin projecting from the grab ring into a bore 77 formed in the connector 74. A further O-ring seal 78 is provided on the connector 74.

A groove 79 is provided on the grab ring 70 to indicate the rotational position of the window 32.

The internal construction of the body 8 and the housing 11 is shown in FIG. 4 in which the objective probe 2 is not shown.

The transversely extending portion 10 of the body 8 is generally tubular having a centrally located tubular pivot member 34 having a cylindrical axis which defines the pivotal axis 16 for the pivotal motion. The pivot member 34 is located on a transversely extending arm 35 of an elbow shaped tubular member 36 which also includes a longitudinally extending arm 38. The longitudinally extending arm 38 terminates in a face 39 within the female connector 7 and which is presented to male connector 6 of the probe 2 when connection is made on fitting the probe 2.

The pivot member 34 is journalled in the housing 11 within a cylindrical recess 40 and is held in place against axial movement by locking pins 41 and 42. An O-ring 43 is located in the recess 40 so as to contact both the housing 11 and the pivot member 34 to thereby provide a degree of friction during rotational movement.

The borescope 1 includes an optical system 44 which is shown partially in FIG. 4 as a series of lenses 45 within the viewing tube 18, the optical system having an optical axis 46 extending longitudinally of the viewing tube 18. The optical axis 46 is folded so as to extend transversely within the body 8 and housing 11 by means of an optical mirror 47 in the housing 11 and the optical mirror 37 in the body 8. The optical axis 46 is coincident with the pivotal axis 16 during this transverse extent between the mirrors 37 and 47.

The body 8 and housing 11 cooperate to define an annular chamber 50 which is external to the pivot member 34 and which extends into both the body and the housing. A further annular chamber 51 is defined within the body 8 externally of the longitudinally extending arm 38 and communicates with the first annular chamber 50. The light guide 20 is coupled to the housing 11 by means of a socket 52 communicating with the annular chamber 50 and contains an optical fibre bundle 53 which extends into the annular chamber 50 and the further annular chamber 51 so as to terminate in an annular surface portion 54 of the face 39. An O-ring 55 is provided in the female connector 7 at a location intermediate the annular surface portion 54 and the optical axis and projects slightly from surface 39 so as to make contact with the male connector 6.

The female connector 7 is further provided with an annular groove 49 into which O-ring 72 is received when the male connector 6 is inserted, O-ring 72 being visible on the male connector 6 of the alternative probe 30 in FIGS. 3 and 6.

The annular chamber 50 is dimensioned such that the optical fibre bundle 53 is a loose fit within the chamber and sufficient slack in the optical fibre bundle within the chamber is provided so that rotation within a predetermined arc of 220 degrees movement of the body 8 relative to the housing 11.

The body 8 and housing 11 are provided with respective stops (not shown) at the interface 15 and arranged to limit the extent of rotational movement to the predetermined arc.

The light source 19 is shown in greater detail in FIG. 5 and includes a casing 60 which defines a cylindrical bore 61 which receives the viewing tube 18 when the light source is assembled with the occular assembly 12 in use. The light source 19 includes a lamp 62 which is cooled by the electric fan 26 and operated by on/off switch 63.

The eyepiece 17 is detachable from the viewing tube 18 by means of a screw fitting 48 to allow assembly and disassembly of the viewing tube and light source.

A collar 29 is adhesively bonded to the viewing tube 18 such that the light source is axially located between the collar and the eyepiece 17. The collar 29 includes an axial projection 64 cooperating with a slot 28 in the casing 60 to prevent rotation of the light source about the viewing tube.

In use the probe 2 is connected to the body 8 as shown in FIG. 1 and the end window 4 of the probe is presented to an object to be viewed. The light source 19 is turned on using switch 63 and light 10 from the lamp 62 is directed into the fibre optic bundle 53 within light guide 20.

Light is conducted through the continuous and uninterrupted fibres of bundle 53 to the face 39 where the light is received and coupled into a corresponding fibre optic bundle (not shown) extending longitudinally within the probe 2. Light emerges from the distal end portion 3 to illuminate the object.

The illuminated object is viewed at the eyepiece 17, an image of the object being transferred through the optical system of the borescope 1 by an optical relay (not shown) of the probe 2, the mirrors 37 and 47 and the lenses 45 of the viewing tube 18. At the face 39, the O-ring 55 serves to prevent stray light entering the optical system from the connecting optical fibre bundles where inevitably some stray light will be emitted. O-ring 43 also serves to prevent stray light from bundle 53 entering the optical system 44 within the housing 11.

The angle between the probe 2 and the viewing tube 18 is adjusted for the convenience of the operator by pivotal movement about the pivotal axis 16. The O-ring 43 provides a limited extent of resistance to this motion which tends to retain the probe 2 at a selected orientation after adjustment.

When alternative probe 30 is used with sheath 31 to provide lateral viewing, the grab ring 70 is rotated to bring the window 32 to the required viewing position using groove 79 as an indicator.

Grab ring 70 allows the probes 2, 30 to be assembled or disassembled with the body 8 using one hand.

The pivot member 34 may in an alternative arrangement be attached to the housing 11 and journalled in the body 8.

The light source 19 may be used in borescopes where no pivotal connection is provided between the body and the occular system as for example where the occular system comprises a viewing tube extending at a fixed cranked angle relative to the probe.

The probe 2 may alternatively include a flexible portion embodying an optical fibre optical system. Such a probe may include a tip which can be remotely manipulated to remotely vary the viewing angle.

We claim:

1. A borescope comprising a rigid objective probe connected to a body, an occular assembly pivotally connected to the body so as to be pivotally movable about a pivotal axis extending transversely with respect to the objective probe, and a optical fibre bundle connected to a light source and extending through the probe to illuminate an object presented to the probe, the occular assembly comprising a housing pivotally connected to the body and cooperating with the body to define a channel through which a flexible portion of the optical fibre bundle extends from the occular assembly into the body whereby pivotal motion of the occular assembly is accommodated by flexure of the optical fibre bundle with the channel, the borescope comprising a tubular pivot member connected to one or other of the body and the housing and defining the pivotal axis and the borescope further comprising an optical system consisting of a series of lenses and mirrors for transferring an image of the object through the probe to an eyepiece of the occular system and defining an optical axis extending through the tubular pivot member coaxially with the pivotal axis, the channel comprising an annular space external to the pivot member and wherein the optical fibre bundle extends through a light guide cable between the light source and the housing, said light guide cable extending from the house at an angle relative to the housing which is invariant with respect to pivotal motion of the objective probe relative to the occular assembly.

2. A borescope as claimed in claim 1 wherein the tubular pivot member is fixedly connected to the body and is journalled in the housing.

3. A borescope as claimed in claim 1 wherein the occular assembly includes a viewing tube extending between the housing and the eyepiece whereby the eyepiece is located remotely from the housing and wherein the light source is mounted on the viewing tube.

4. A borescope as claimed in claim 3 wherein the probe is releasably connected to a probe connector of the body and wherein the optical fibre bundle includes a first portion extending continuously and unitarily between the probe connector and the light source.

5. A borescope as claimed in claim 3 wherein the light source comprises a casing defining a cylindrical bore receiving the viewing tube.

6. A borescope as claimed in claim 5 wherein the eyepiece is removable from the viewing tube to facilitate assembly and disassembly of the viewing tube and light source.

7. A borescope comprising an objective probe connect to a body, an occular assembly pivotally connected to the body so as to be pivotally movable about a pivotal axis extending transversely with respect to the objective probe, and an optical fibre bundle connected to a light source and extending through the probe to illuminate an object presented to the probe, the occular assembly comprising a housing pivotally connected to the body and cooperating with the body to define a channel through which a flexible portion of the optical fibre bundle extends from the occular assembly into the body whereby pivotal motion of the occular assembly is accommodated by flexure of the optical fibre bundle within the channel, the borescope comprising a tubular pivot member connected to one or other of the body and the housing and defining the pivotal axis and the borescope further comprising an optical system consisting of a series of lenses and mirrors for transferring an image of the object through the probe to an eyepiece of the occular system and defining an optical axis extending through the tubular pivot member coaxially with the pivotal axis, the channel comprising an annular space external to the pivot member, and wherein the probe is releasably connected to the body by coupling means facilitating relative rotation between the probe and the body and wherein the probe is provided with a removable sheath having a lateral viewing mirror, the sheath being connectable to the probe such that the probe and sheath are keyed together for rotation in unison relative to the body.

* * * * *